US011639083B2

(12) United States Patent
Henderson et al.

(10) Patent No.: US 11,639,083 B2
(45) Date of Patent: May 2, 2023

(54) HINGED CONTROL BOX ASSEMBLY FOR AN AIR CONDITIONER UNIT

(71) Applicant: Haier US Appliance Solutions, Inc., Wilmington, DE (US)

(72) Inventors: Richard Dustin Henderson, La Grange, KY (US); Cody Michael Ratchford, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 411 days.

(21) Appl. No.: 16/924,690

(22) Filed: Jul. 9, 2020

(65) Prior Publication Data

US 2022/0009305 A1 Jan. 13, 2022

(51) Int. Cl.
*B60H 1/00* (2006.01)
*B60P 3/32* (2006.01)
*B60H 1/26* (2006.01)

(52) U.S. Cl.
CPC ..... *B60H 1/00364* (2013.01); *B60H 1/00514* (2013.01); *B60H 1/262* (2013.01); *B60P 3/32* (2013.01)

(58) Field of Classification Search
CPC ............ B60H 1/00364; B60H 1/00371; B60H 1/00514; B60H 1/00535; F24F 13/20
USPC ........................................................ 296/210
See application file for complete search history.

(56) References Cited

U.S. PATENT DOCUMENTS

| 6,339,934 | B1* | 1/2002 | Yoon .................. B60H 1/00535 62/244 |
| 9,746,231 | B2 | 8/2017 | Kim |
| 10,309,683 | B2 | 6/2019 | Choi |
| 11,425,337 | B2* | 8/2022 | Murao .................. G06V 10/96 |
| 2017/0045259 | A1* | 2/2017 | Choi .................. F24F 13/1426 |
| 2018/0328620 | A1 | 11/2018 | Iinuma |
| 2019/0047354 | A1* | 2/2019 | Williamson ....... B60H 1/00364 |
| 2019/0120520 | A1* | 4/2019 | Miyata .................. F24F 1/0063 |
| 2021/0061060 | A1* | 3/2021 | Meda ................. B60H 1/00535 |

FOREIGN PATENT DOCUMENTS

EP          3441693 A1     2/2019

\* cited by examiner

*Primary Examiner* — Jason S Daniels
(74) *Attorney, Agent, or Firm* — Dority & Manning, P.A.

(57) ABSTRACT

A recreational vehicle air conditioner (RVAC) includes a ceiling-mount indoor panel positioned over an opening in the ceiling of a recreational vehicle and a control box assembly including a first box portion and a second box portion. The first box portion is positioned above the ceiling-mount indoor panel and the second box portion is pivotally connected to the first box portion with a hinge, such that it is pivotable between a closed configuration and an open configuration. The ceiling-mount indoor panel defines a control box recess that at least partially receives the second box portion when in the open configuration and a blank plate covers the control box recess when the second box portion is in the closed configuration.

20 Claims, 10 Drawing Sheets

HINGED CONTROL BOX ASSEMBLY FOR AN AIR CONDITIONER UNIT

FIELD OF THE INVENTION

The present subject matter relates generally to air conditioners in recreational vehicles, and more particularly, to electronic control housings for air conditioner units.

BACKGROUND OF THE INVENTION

Certain recreational vehicles include an air conditioning system, referred to generally as a recreational vehicle air conditioner (RVAC), for maintaining a comfortable temperature within the passenger compartment. The air conditioning units are typically mounted on the roof or another exterior location of the recreational vehicle and utilize a sealed system for circulating refrigerant between an indoor and outdoor heat exchanger to facilitate heat transfer. For example, the indoor heat exchanger is positioned within an indoor portion of the RVAC and is in fluid communication with the passenger compartment through an opening in the roof. The outdoor heat exchanger is positioned within the outdoor portion and is separated from the indoor heat exchanger by a partition or divider.

Conventional RVACs include a gasket mounted between the air conditioning unit and the roof of the recreational vehicle. The air conditioning unit is commonly secured to the roof by passing four bolts through an indoor panel positioned on an opposite side of the roof from the air conditioning system (i.e., within the passenger compartment). The bolts pass into the air conditioner unit to compress the gasket and secure the unit. However, in order to access control electronics of the air conditioner unit, the indoor panel must typically be removed, thus loosening the air conditioning unit, and frequently requiring the gasket to be replaced before reinstalling the unit. Thus, the electronic control housing in known RVAC units is cumbersome to access. In addition, the electronic control housing in known RVAC units can require a service technician on a ladder to remove and simultaneously handle multiple components.

Accordingly, an improved air conditioner unit would be useful. More specifically, a recreational vehicle air conditioner with a control housing that is easy to access would be particularly beneficial.

BRIEF DESCRIPTION OF THE INVENTION

Aspects and advantages of the invention will be set forth in part in the following description, or may be apparent from the description, or may be learned through practice of the invention.

In one exemplary aspect of the present disclosure, a recreational vehicle air conditioner is provided including a ceiling-mount indoor panel defining an air inlet, an air outlet, and a control box recess. A control box includes a first box portion and a second box portion, the first box portion positioned above the ceiling-mount indoor panel, the second box portion connected to the first box portion with a hinge and being pivotable between a closed configuration and an open configuration on the hinge, wherein the second box portion is seated at least partially within the control box recess in the open configuration.

In another exemplary aspect of the present disclosure, a recreational vehicle is provided including a ceiling defining an opening, a ceiling-mount indoor panel defining an air inlet, an air outlet, and a control box recess, and a control box assembly mounted to the ceiling-mount indoor panel. The control box assembly includes a first box portion positioned above the ceiling-mount indoor panel and a second box portion pivotally connected to the first box portion and being movable between a closed configuration and an open configuration, wherein the second box portion is seated at least partially within the control box recess in the open configuration.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

Figure 1:
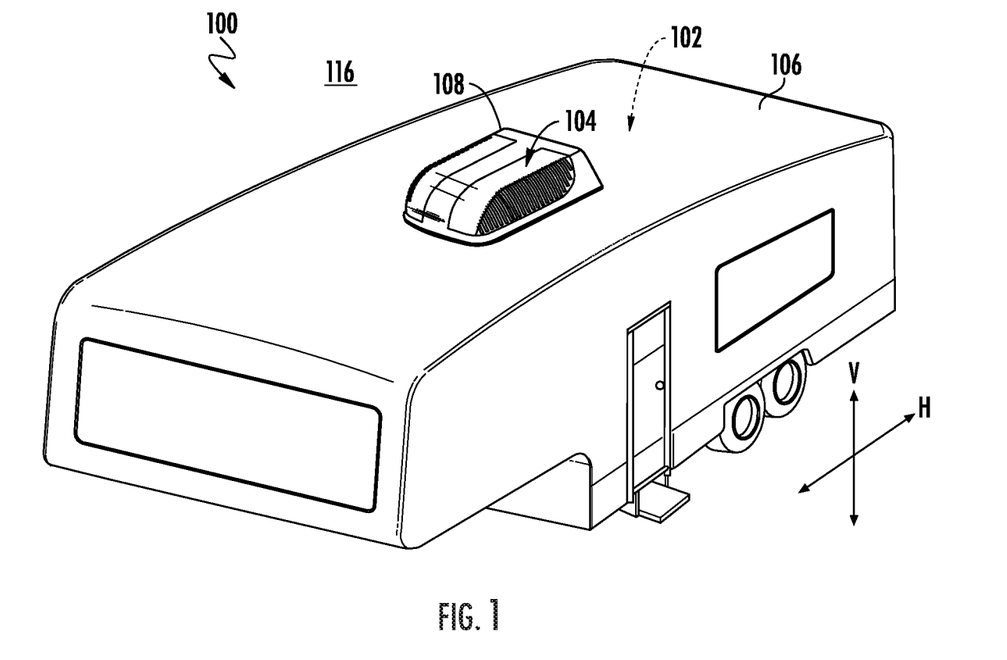
FIG. 1 provides a perspective view of a recreational vehicle according to an exemplary embodiment of the present disclosure.

FIG. 1 provides a perspective view of an exemplary recreational vehicle 100 in accordance with the present disclosure. People may employ recreational vehicle 100 for a variety of purposes, including transportation, cooking, eating, sleeping, entertaining, and the like. As such, recreational vehicle 100 defines a passenger compartment 102, which may further include a bed, stove, table, restroom, or multiple compartments for storing items that passengers wish to take with them on their travels. Because people often spend significant time within the passenger compartment 102 of recreational vehicle 100, climate control of the passenger compartment is desirable.

Accordingly, an air conditioning system or air conditioner 104 may be mounted on recreational vehicle 100 to provide cooled air to the passenger compartment 102. Air conditioning system 104 is typically mounted to an outside surface 106 of recreational vehicle 100. This arrangement is desirable because a byproduct of operation of air conditioning system 104 is heated air, which has been passed over a heat exchanger to remove heat from the air circulating within passenger compartment 102. During certain operations, this heated air may be exhausted to the ambient air. As shown in the exemplary embodiment of FIG. 1, air conditioning system 104 may be mounted on an outer surface 106, such as the ceiling or top of recreational vehicle 100. Also as shown in FIG. 1, air conditioning system 104 may include a top cover or outer grill 108 that is positioned over the working components air conditioning system 104, e.g., to protect such working components from rain, wind, debris, etc. Although an exemplary recreational vehicle is illustrated, it should be appreciated that air conditioner 104 may be used in or with any suitable recreational vehicle.

Figure 2:
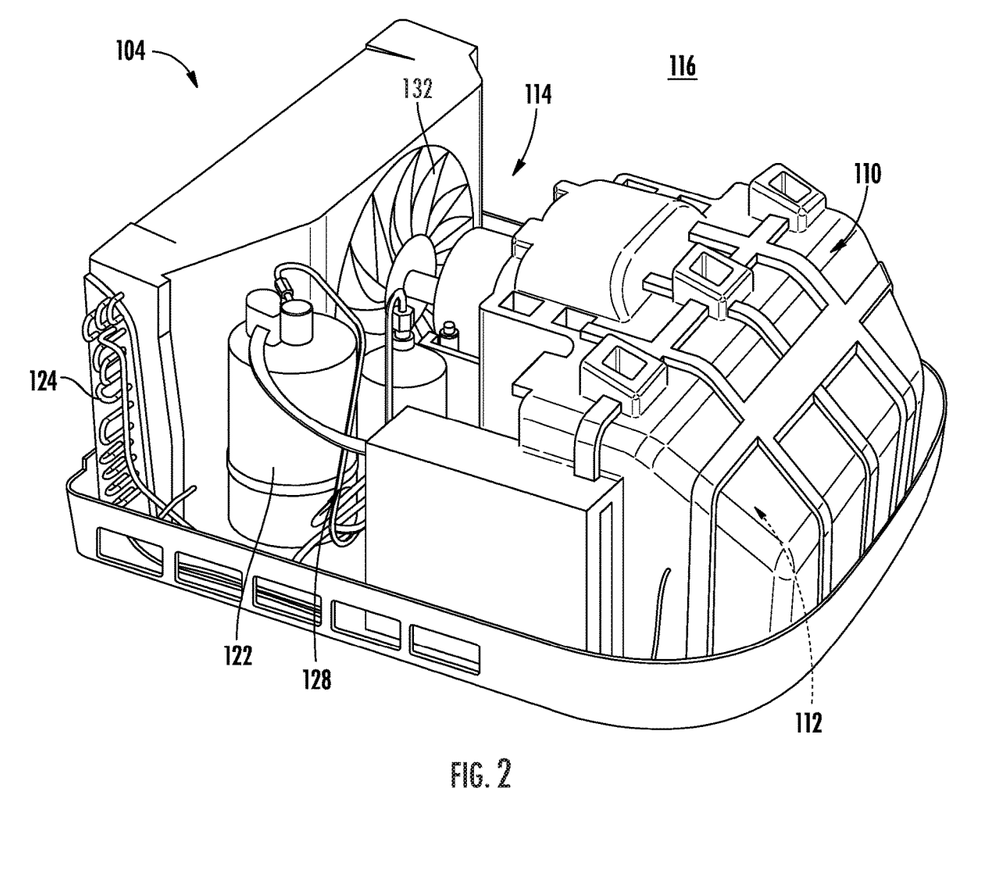
FIG. 2 provides a perspective view of a recreational vehicle air conditioner (RVAC) that may be used with the exemplary recreational vehicle of FIG. 1, with an outdoor cover removed for clarity.
Figure 3:
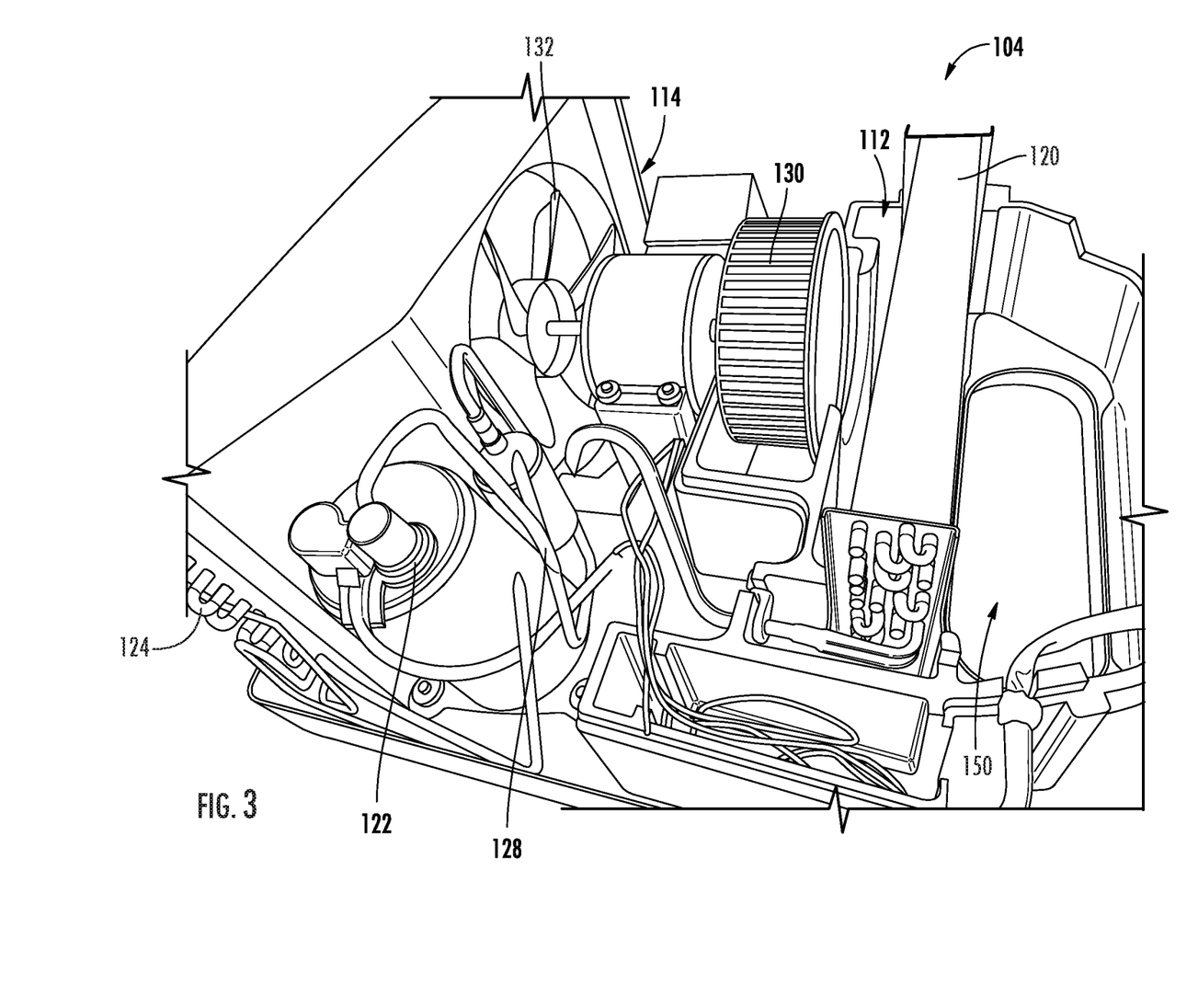
FIG. 3 provides a perspective view of the exemplary RVAC of FIG. 2 with an indoor cover removed for clarity.
Figure 4:
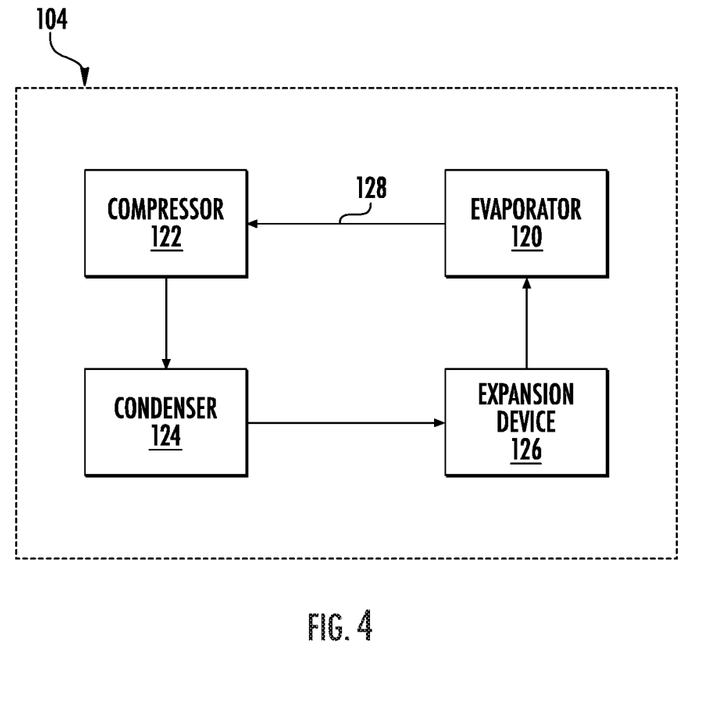
FIG. 4 provides a schematic view of an air conditioning system according to an exemplary embodiment of the present disclosure.

Referring now generally to FIGS. 2 through 4, the operation of air conditioning system 104 will be described in more detail according to exemplary embodiments of the present subject matter. In this regard, FIG. 2 illustrates a top, perspective view of air conditioner 104 of recreational vehicle 100 with outer grill 108 removed to reveal internal working components of air conditioner 104. As illustrated, air conditioning system 104 generally includes an indoor bulkhead or indoor cover 110 that divides air conditioning system 104 between an indoor and outdoor portion, such as in a packaged terminal air conditioner unit (PTAC) or a split heat pump system. Specifically, indoor cover 110 defines and indoor air plenum 112 and an outdoor air plenum 114.

In this regard, indoor cover 110 generally shields the indoor components of air conditioning system 104 from the outdoor environment 116.

Referring now also to FIG. 3, indoor cover 110 is removed to reveal additional working components of air conditioning system 104. In addition, FIG. 4 illustrates a schematic view of air conditioning system 100. Relevant components of air conditioning system 104 will now be described. It should be understood that air conditioning system 104 includes various heat pump components, such as a sealed system, for treating air within an interior of an associated recreational vehicle 100. Such components are well understood by those skilled in the art and a description of such components is omitted for the sake of brevity.

In this regard, for example, air conditioning system 104 includes refrigerant circulating between evaporator 120, compressor 122, condenser 124, and expansion device 126, as shown in the refrigeration loop 128 of air conditioning system 104 in FIGS. 2 through 4. Refrigerant, also known as coolant, carries heat from the passenger compartment 102 of recreational vehicle 100 to the outdoors 116 (e.g., ambient area surrounding outer surface 106 of the passenger compartment 102). Refrigerant is useful because it changes states from a liquid to a vapor at convenient temperatures for a refrigeration cycle. One suitable refrigerant for use in refrigeration loop 128 is 1,1,1,2-Tetrafluoroethane, also known as R-134A, although it should be understood that the present disclosure is not limited to such example and that any suitable refrigerant may be utilized. For example, according to an exemplary embodiment, the refrigerant may be R-410A or another refrigerant.

The refrigerant begins by passing through evaporator 120 in liquid form. Ambient air or air from the passenger compartment 102 may pass over evaporator 120, e.g., as motivated by an evaporator air handler. More specifically, as illustrated, air conditioner system 104 may include an indoor fan 130 configured for urging a flow of indoor air. Because the liquid refrigerant is cold in this low-pressure state, it absorbs heat from the air passed over it, cooling the air for delivery to the passenger compartment 102. As the liquid refrigerant absorbs heat, it evaporates into a vapor. From there, the gaseous refrigerant is delivered to compressor 122, which increases the pressure of the refrigerant, thus raising its temperature well-above the ambient temperature outside of recreational vehicle 100. From compressor 122, the heated refrigerant is delivered to condenser 124. Air may pass over condenser 124, e.g., as motivated from a condenser air handler. More specifically, as illustrated, air conditioning system 104 may include an outdoor fan 132 configured for urging a flow of outdoor air, thereby facilitating heat transfer from the heated refrigerant to the ambient air. In releasing this heat energy, the refrigerant condenses back into liquid form. Next, the refrigerant is delivered to expansion device 126, where the pressure of the refrigerant is reduced, thus decreasing its temperature. The cooled, liquid refrigerant is then delivered back to evaporator 120 to repeat the process.

Figure 5:
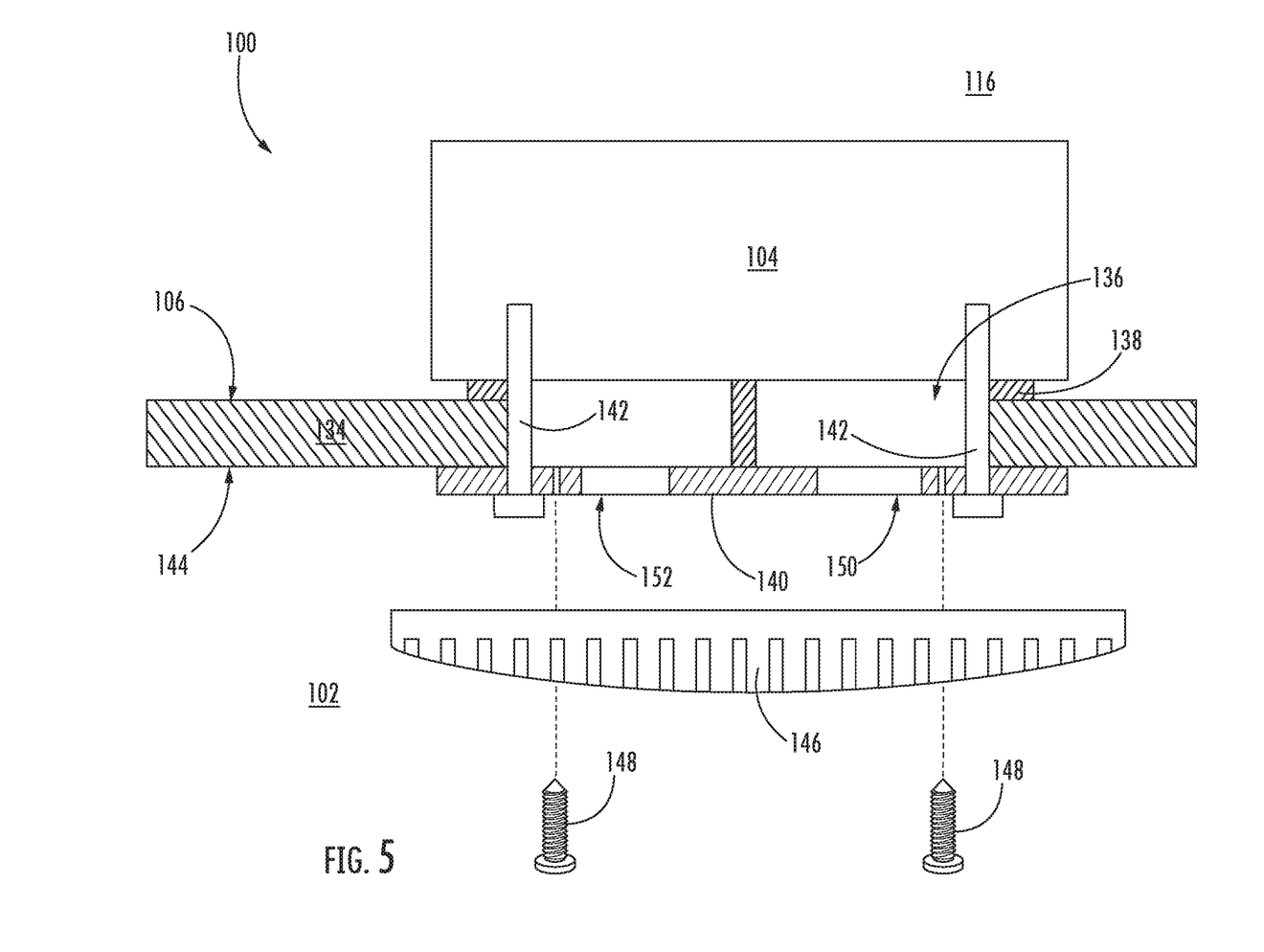
FIG. 5 is a schematic side view of the exemplary air conditioner unit of FIG. 2 mounted on a ceiling of a recreational vehicle according to an exemplary embodiment of the present subject matter.

FIG. 5 provides a side schematic view of air conditioner system 104 mounted on a ceiling 134 of recreational vehicle 100. As explained above, air conditioning system 104 is mounted to outer surface 108 of ceiling 134. As illustrated in FIG. 5, air conditioner 104 is seated over an opening 136 within ceiling 134, e.g., to cover opening 136. In addition, a gasket 138 may be positioned between the air conditioner 104 and ceiling 134, e.g., to provide an airtight seal in prevent outside dirt and debris from passing into passenger compartment 102 through opening 136. Air conditioner 104 may be secured to ceiling 134 by mounting an indoor panel 140 within passenger compartment 102 and passing a plurality of bolts 142 or other suitable mechanical fasteners through indoor panel 140 and into air conditioner unit 104. According to an exemplary embodiment, indoor panel 140 is a substantially rigid metal plate that has one or more apertures for receiving bolts 142. As bolts 142 are tightened, air conditioner unit 104 is drawn firmly onto outer surface 106, thereby compressing gasket 138 and creating a seal with ceiling 134. Simultaneously, indoor panel 140 is urged firmly against an inner surface 144 of ceiling 134 to secure air conditioner unit 104 in place.

Figure 6:
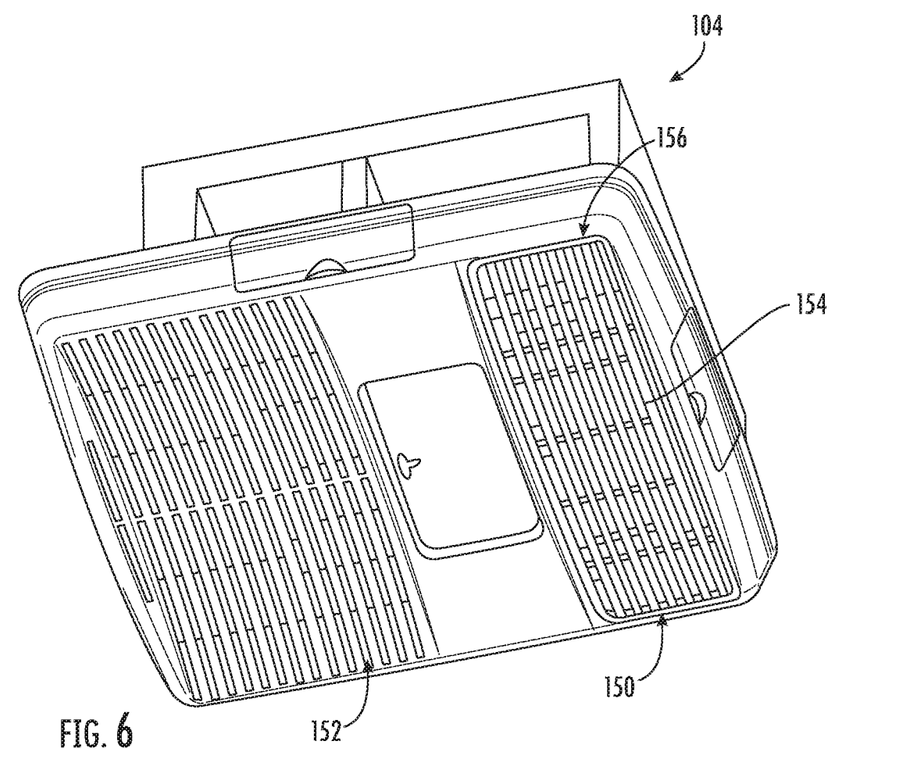
FIG. 6 is a bottom perspective view of the exemplary RVAC of FIG. 2 according to an example embodiment.
Figure 7:
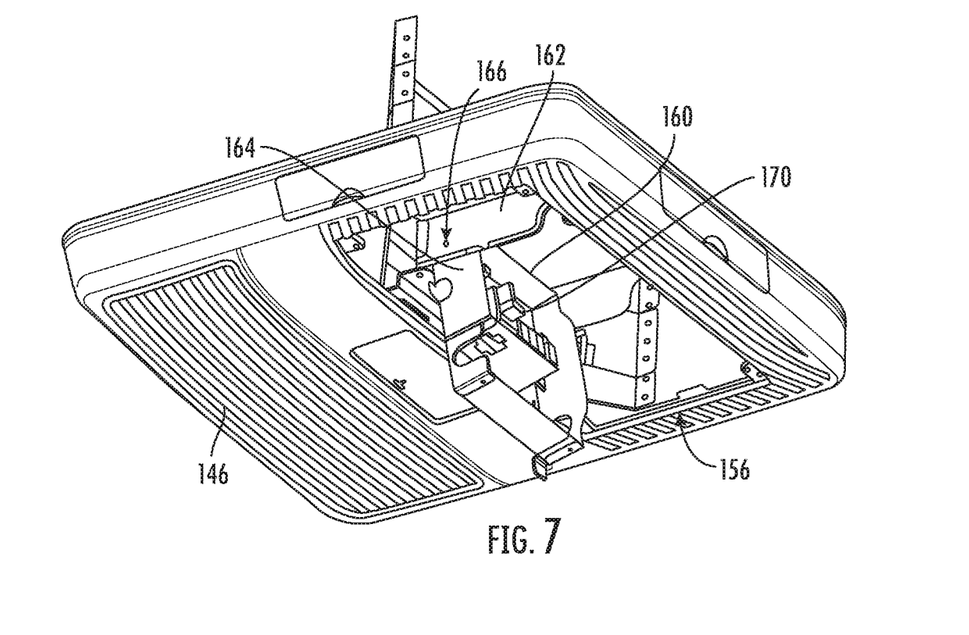
FIG. 7 is a bottom perspective view of an indoor grill and a control box of the exemplary RVAC of FIG. 2, in which the control box is shown in an open configuration.

Referring now also to FIGS. 6 and 7, air conditioner 104 may further include an indoor grill 146 that is positioned over indoor panel 140. Specifically, FIGS. 6 and 7 are bottom perspective views of air conditioner 104 according to an example embodiment with certain components removed for clarity. For example, indoor grill 146 may be mounted on inner surface 144 of ceiling 134 of recreational vehicle 100, e.g., within an interior or passenger compartment 102 of recreational vehicle 100. As shown, indoor grill 146 may be secured directly to indoor panel 140 using one or more mechanical fasteners 148. Although indoor panel 140 and indoor grill 146 are illustrated herein as two separate components, it should be appreciated that according to exemplary embodiments a single component may replace both indoor panel 140 and indoor grill 146. In addition, these components may be formed from any suitable material and may have any suitable shape, configuration, and mounting mechanisms.

Indoor grill 146 may overlay and hide components of air conditioner 104 to provide a pleasant cosmetic appearance for air conditioner 104 when viewed from passenger compartment 102. In addition, indoor grill 146 may facilitate filtering air circulated through the air conditioner 104. For example, indoor grill 146 may also include perforated sections to allow air to flow through indoor grill 146. For example, indoor grill 146 and indoor panel 140 may include an air inlet 150 and an air outlet 152. Air inlet and outlets 150, 152 may be separate from each other on indoor panel 140. Air from within passenger compartment 102 of recreational vehicle 100 may flow through indoor grill 146 and indoor panel 140 via air inlet 150, and such air may be treated (e.g., heated or cooled) by a sealed system of air conditioner 104 (see, e.g., FIGS. 2 through 4), and the treated air may then flow back into the passenger compartment 102 through indoor grill 146 and indoor panel 140 via air outlet 152. Indoor grill 146 may also include a removable filter cover 154 mounted to indoor grill 146 at an opening 156 defined through indoor grill 146. Filter cover 154 may be perforated to allow air flow through filter cover 154, and filter cover 154 may also support or hold a filter medium, such as a concertinaed or pleated fabric filter, fiberglass filter, etc., that filters air entering air conditioner 104 at air inlet 150.

FIG. 7 is a bottom perspective view of indoor grill 146 and a control box assembly or a control box 160 of air conditioner 104. Specifically, as shown in FIG. 7, filter cover 154 may be removed to reveal indoor panel 140 and control box 160. Control box 160 includes a first box portion 162 and a second box portion 164. First box portion 162 of control box 160 is positioned above indoor grill 146 and indoor panel 140. For example, first box portion 162 of control box 160 may be mounted to indoor panel 140. Second box portion 164 of control box 160 is connected to first box portion 162 of control box 160 with a hinge 166, such as a rivet hinge, screw, etc. Thus, e.g., second box portion 164 of control box 160 may be pivotable relative to indoor grill 146, as discussed in greater detail below. An electronic control panel 170 is mounted to second box portion 164 of control box 160.

In general, indoor panel 140 and control box 160 may be formed from any suitable material and may have any suitable shape, number of walls, geometry, configuration, etc. For example, according to an exemplary embodiment, control box 160 may be formed from any suitably rigid material, such as metal, injection molded plastic, etc. According to exemplary embodiments, control box 160 may further be formed from an electrically insulating material, such as plastic or polycarbonate. Other suitable materials are possible and within the scope of the present subject matter.

Figure 8:
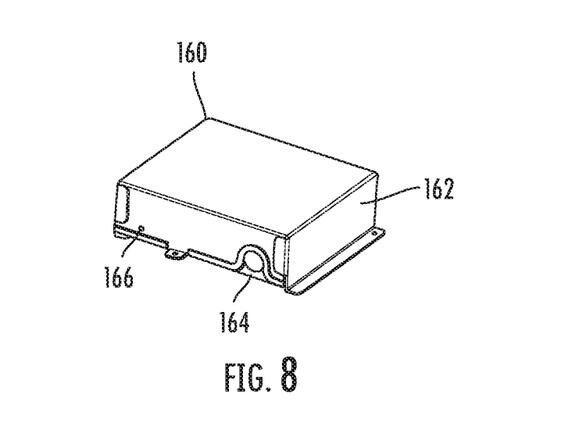
FIG. 8 is a top perspective view of the control box of FIG. 7 in a closed configuration.
Figure 9:
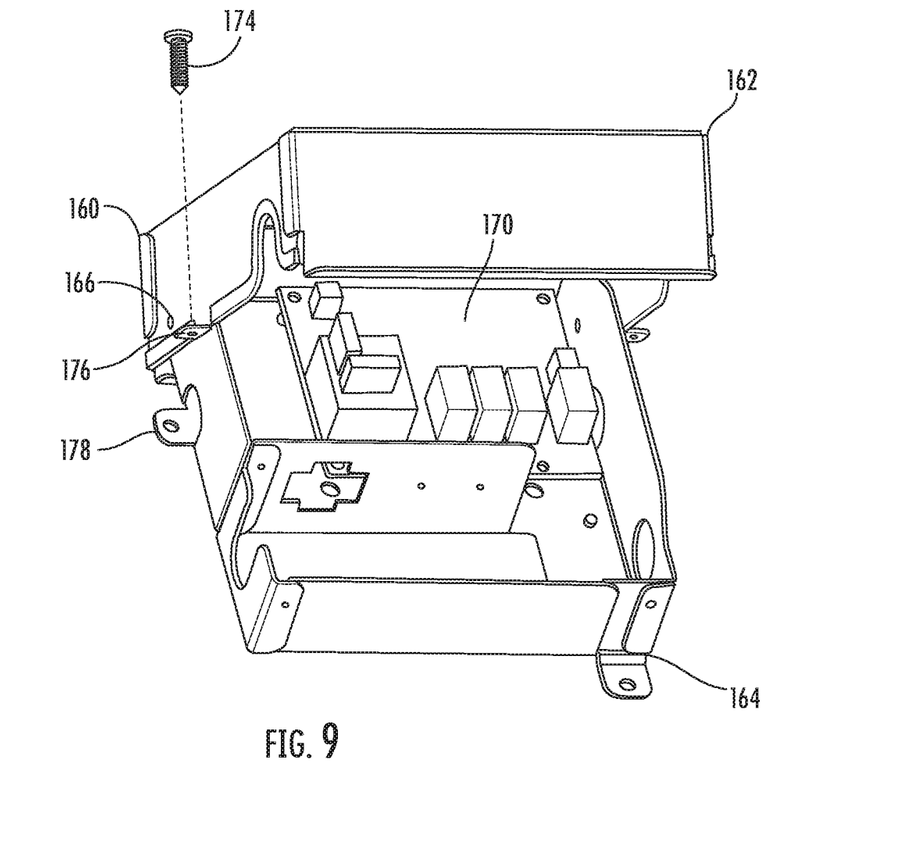
FIG. 9 is a bottom perspective view of the control box of FIG. 7 in the open configuration.

Control box 160 is described in greater detail below with reference to FIGS. 7 through 9. As shown in FIGS. 8 and 9, second box portion 164 is pivotable between a closed configuration (FIG. 8) and an open configuration (FIG. 9) on hinge 166. Second box portion 164 is nested within first box portion 162 in the closed configuration. For example, an outer perimeter of second box portion 164 may be complementary to an inner perimeter of first box portion 162 such that second box portion 164 is received within first box portion 162 in the closed configuration. As shown in FIG. 9, second box portion 164 is pivoted away from first box portion 162 on hinge 166 in the open configuration. For example, second box portion 164 may be angled relative to first box portion 162 on hinge 166 by no less than ninety degrees (90°) and no more than one-hundred and fifty degrees (150°) in the open configuration. As shown in FIGS. 8 and 9, each of first and second box portions 162, 164 of control box 160 may have a rectangular cross-section, e.g., in a plane that is perpendicular to the vertical direction V in the closed configuration.

Electronic control panel 170 may be accessed by shifting second box portion 164 from the closed configuration (FIG. 8) to the open configuration (FIG. 9). In particular, electronic control panel 170 is encased within control box 160 when second box portion 164 is in the closed configuration. For example, electronic control panel 170 may be positioned within an interior of control box 160 defined between first and second box portions 162, 164 when second box portion 164 is in the closed configuration. Thus, a service technician may be unable to access electronic control panel 170 when second box portion 164 is in the closed configuration. Conversely, electronic control panel 170 is exposed when second box portion 164 is in the open configuration. For example, electronic control panel 170 may be pivoted out of the interior of control box 160 when second box portion 164 is in the open configuration. Thus, the service technician may access and view electronic control panel 170 when second box portion 164 is in the open configuration. Due to the hinged connection between first and second box portions 162, 164, second box portion 164 may hang downwardly from first box portion 162, and the service technician may access electronic control panel 170 without needing to support (i.e., hold up) electronic control panel 170. Thus, the service technician may advantageously have two free hands to work on electronic control panel 170 in the open configuration.

As may be seen from the above, hinge 166 may allow second box portion 164 and electronic control panel 170 thereon to advantageously swing open but not completely separate from control box 160. Thus, the first and second box portions 162, 164 may advantageously remain connected by hinge 166 in both the open and closed configurations.

First box portion 162 may be positioned above opening 156 in indoor grill 146 and above air inlet 150 of indoor panel 140. Thus, a service technician may reach through opening 156 to access control box 160, e.g., and adjust second box portion 164 between the open and closed configurations. Second box portion 164 may also be positioned above opening 156 in indoor grill 146 and above air inlet 150 of indoor panel 140 in the closed position. Conversely, second box portion 164 may extend through opening 156 in indoor grill 146 and below air inlet 150 of indoor panel 140 in the open configuration, as shown in FIG. 9. Such movement of second box portion 164 at opening 156 may further facilitate access to electronic control panel 170 on second box portion 164. In particular, the service technician may pivot second box portion 164 to the open configuration such that second box portion 164 extends through opening 156 and such movement of second box portion 164 may also move electronic control panel 170 to a location at which the service technician may easily access electronic control panel 170. For example, electronic control panel 170 may extend through opening 156 with second box portion 164.

FIG. 9 is a bottom perspective view of control box 160. As shown, control box 160 may include fasteners 174 for selectively securing second box portion 164 in the closed configuration. For example, as shown in FIG. 9, first and second box portions 162, 164 may each defining a respective tab 176, 178. Tab 176 of first box portion 162 may be positioned at tab 178 of second box portion 164 with one of fasteners 174 extending through tabs 176, 178 in the closed configuration. Thus, fasteners 174 may prevent inadvertent opening of control box 160.

It will be understood that in alternative example embodiments, electronic control panel 170 may be positioned on and mounted to first box portion 162. Thus, electronic control panel 170 may be fixed relative to first box portion 162, and electronic control panel 170 may be accessed by pivoting second box portion 164 to the open configuration.

Figure 10:
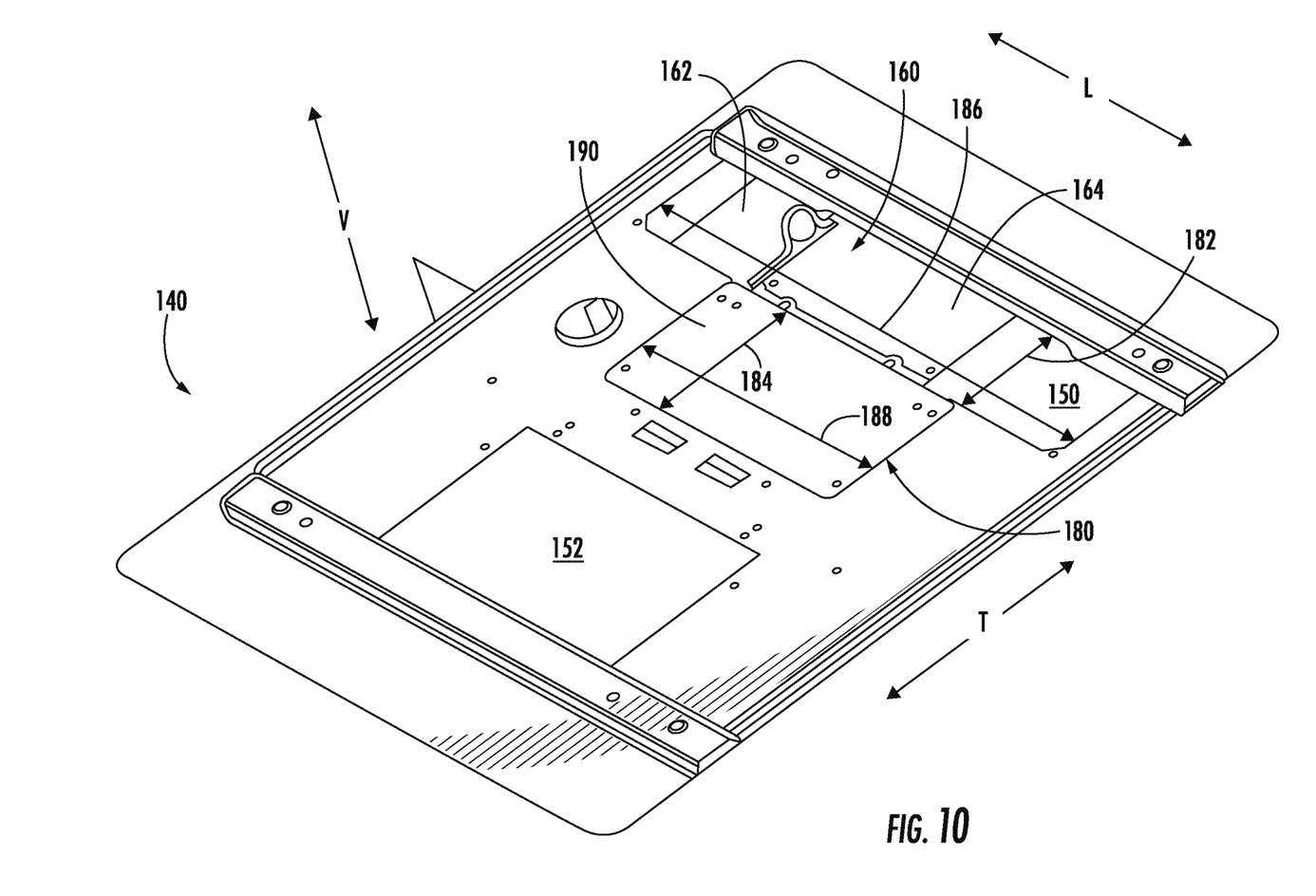
FIG. 10 is a bottom perspective view of the control box and the indoor panel of the example recreational vehicle air conditioner of FIG. 2.
Figure 11:
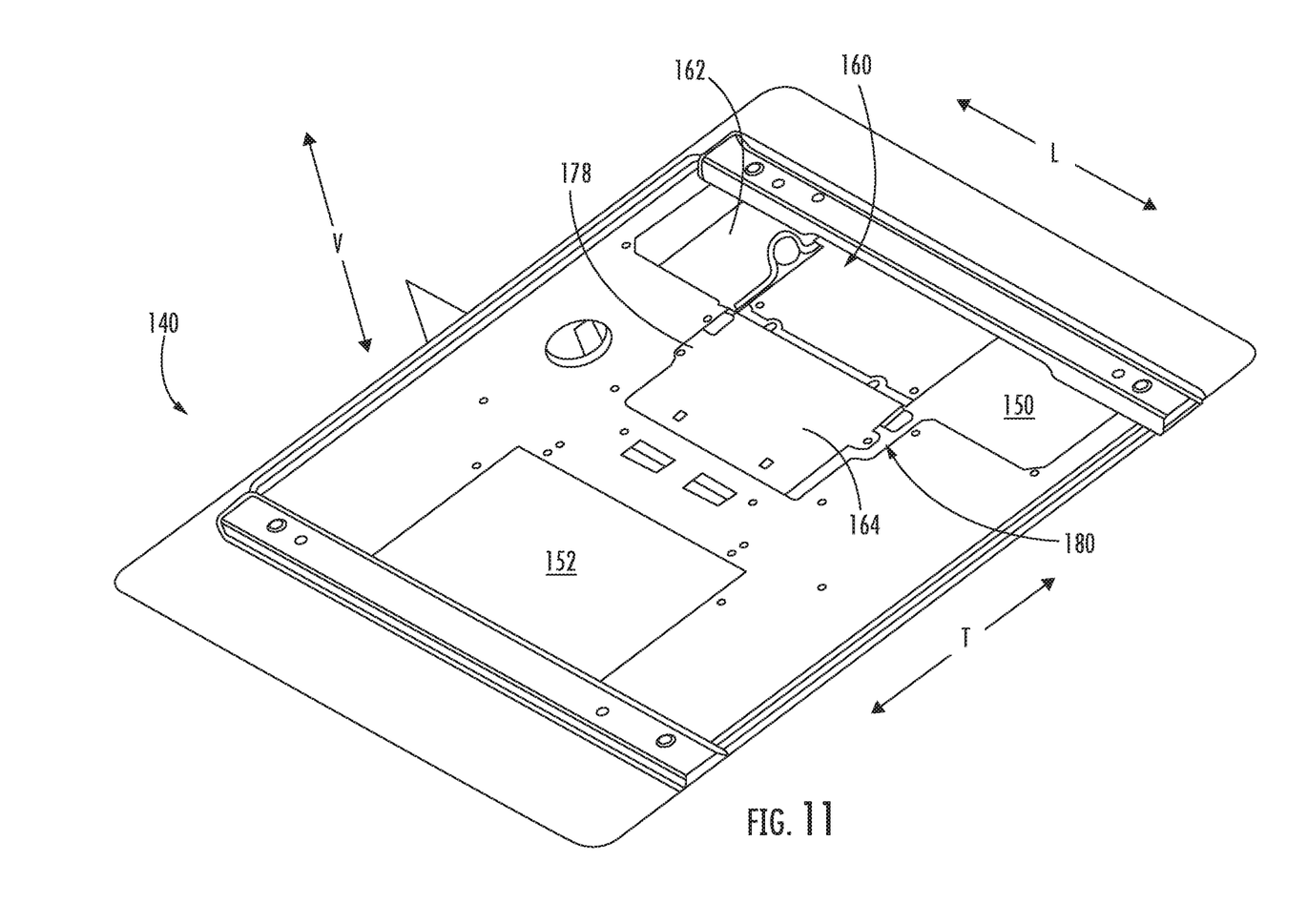
FIG. 11 is a bottom perspective view of the control box and the indoor panel of the example recreational vehicle air conditioner of FIG. 2.
Figure 12:
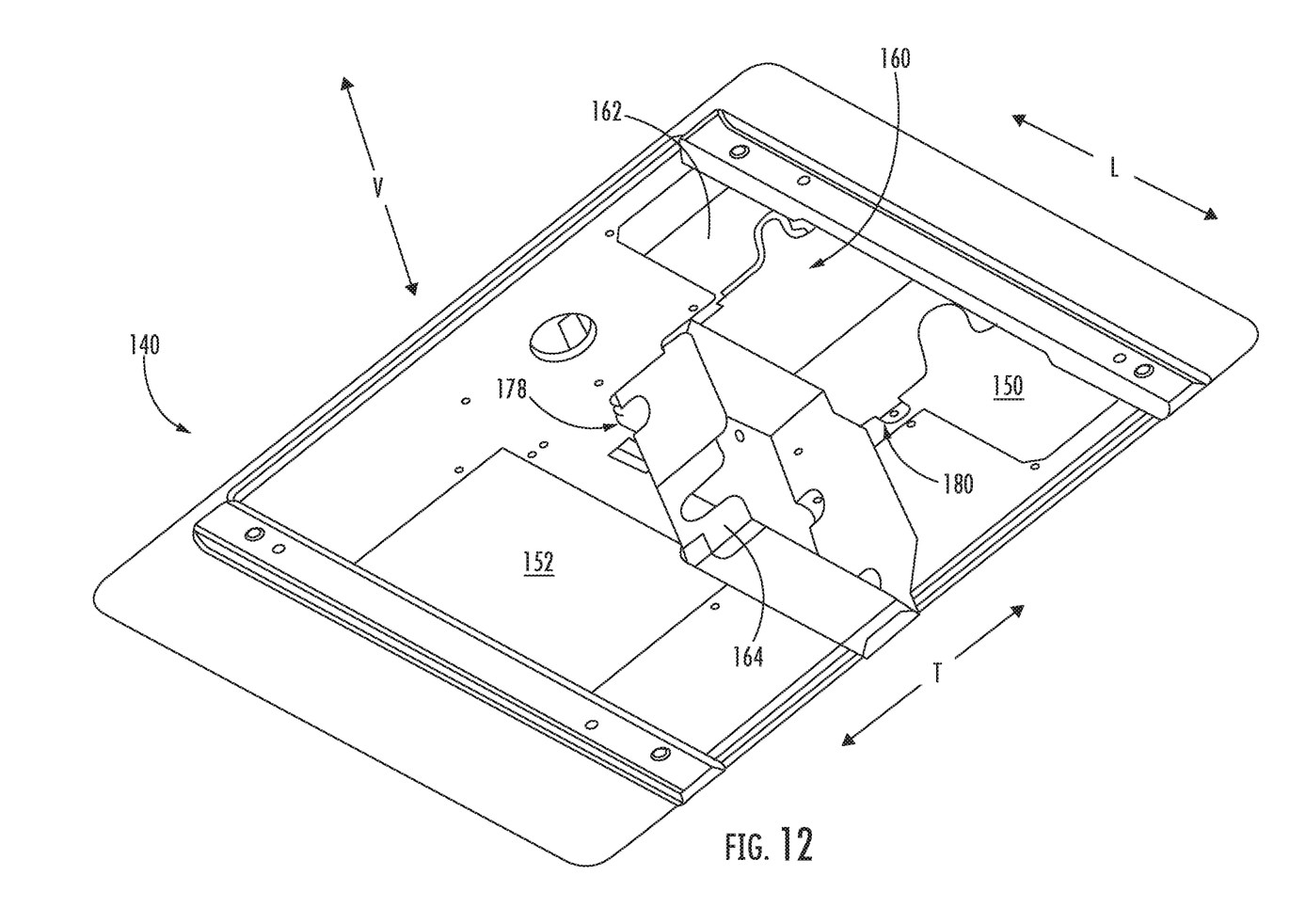
FIG. 12 is a bottom perspective view of the control box and the indoor panel of the example recreational vehicle air conditioner of FIG. 2.

Referring now to FIGS. 10 through 12, indoor panel 140 and control box 160 will be described in more detail according to an exemplary embodiment of the present subject matter. Specifically, these figures illustrate indoor panel 140 and control box 160 with other components of air conditioner 104 and indoor grill 146 removed for clarity. Indoor panel 140 and control box 160 generally define a vertical direction V (e.g., parallel to vertical direction V of recreational vehicle 100), a lateral direction L, and a transverse direction T (e.g., corresponding to the forward/aft direction of travel of recreational vehicle 100 within horizontal plane H). Each direction V, L, T is perpendicular to each other, such that an orthogonal coordinate system is generally defined. Although an exemplary configuration of these components is illustrated in described herein, it should be appreciated that variations and modifications may be made by remaining within the scope of the present subject matter.

As explained above, indoor panel 140 defines air inlet 150 and air outlet 152 to permit airflow through the air conditioner 104. In addition, indoor panel 140 further defines a control box recess 180 that is generally configured for receiving a portion of control box 160, e.g., when second box portion 164 is pivoted toward the open configuration. In this regard, control box recess 180 is a slot, a void, or another cutout otherwise defined within the indoor panel 140 that has substantially the same or slightly larger width than second box portion 164. In this manner, when second box portion 164 is pivoted toward the open configuration (e.g., as shown in FIG. 12), control box recess 180 provides space into which second box portion 164 may be received.

Notably, as illustrated, control box 160 is generally positioned within air inlet 150 and thereby blocks at least a portion of the flow that would otherwise pass through air inlet 150. As a result, according to exemplary embodiments, air inlet 150 is made wider than air outlet 152 in order to compensate for the space covered by control box 160. Thus, according to an exemplary embodiment, air inlet 150 defines an inlet flow area an air outlet 152 defines an outlet flow area, wherein the inlet flow area is substantially similar to the outdoor flow area. It should be appreciated that the number, size, position, and configuration of air inlet 150 and air outlet 152 may vary while remaining within the scope of the present subject matter.

As best illustrated in FIGS. 10 through 12, air inlet 150 defines an inlet depth 182 measured along the transverse direction T and control box recess 180 defines a recess depth 184 measured along the transverse direction T. in addition, air inlet 150 defines an inlet width 186 measured along the lateral direction L and control box recess 180 defines a recess width 188 measured along the lateral direction L. It should be appreciated that the dimensions 182-188 may vary as needed depending on the particular application, the size of control box 160, the desired flow area of air inlet 150, or for any other suitable reason. According to the illustrated embodiment, air inlet 150, air outlet 152, and control box recess 180 all have substantially rectangular cross-sections in a plane that is perpendicular to the vertical direction V. However, it should be appreciated that the cross-sectional shape and size may vary while remaining within the scope of the present subject matter.

According to exemplary embodiments, the recess depth 184 is greater than the inlet depth 182. In this manner, a larger control box 160 may be used due to the additional space provided for pivoting second box portion 164 into control box recess 180. According to alternative embodiments, recess depth 184 may be substantially equal to or slightly less than inlet depth 182. For example, recess depth 184 may be equal to, 20% greater than, 40% greater than, 60% greater than, 80% greater than, or greater than two times inlet depth 182. In addition, or alternatively, recess depth 184 may be less than three times, less than two times, less than 50%, or lower, of inlet depth 182.

According to exemplary embodiments, recess width 188 may be greater than half of inlet width 186. Such a recess width 188 may facilitate the use of a wider control box 160, resulting in better electronic component cooling, easier access, etc. For example, recess width 188 may be greater than 20%, greater than 40%, greater than 60%, greater than 80%, or greater, of inlet width 186. In addition, or alternatively, recess width 188 may be less than 90%, less than 70%, less than 50%, less than 30%, or less than 10% of inlet width 186. Other suitable lengths and widths are possible and within the scope of the present subject matter.

Notably, due to the void within indoor panel 140 resulting from control box recess 180, air conditioner 104 may further include a blank plate 190 that is removably mounted over control box recess 180. In this regard, for example, blank plate 190 serves to prevent airflow through control box recess 180 thereby forcing all inlet air through air inlet 150. In addition, blank plate 190 may partially cover or be positioned over a portion of control box 160. Notably, the use of control box recess 180 and blank plate 190 facilitate a larger control box 160 that is easier to access without excessively restricting air inlet 150.

In practice, when a technician needs to access electronic control panel 170 or other electrical components within control box 160, they may remove the indoor grill 146 (e.g., as shown in FIG. 10) by unscrewing fasteners 148. The technician may then remove blank plate 190 (e.g., by removing additional fasteners) to reveal the full depth of second box portion 164 of control box 160 (e.g., as shown in FIG. 11). After indoor grill 146 and blank plate 190 are removed, the technician may remove one or more fasteners that secure second box portion 164 and first box portion 162 in the closed configuration, after which second box portion 164 may be freely pivoted on hinge 166 to the open position (e.g., as shown in FIG. 12). Notably, control box 160 is then a fully accessible, open space through which the technician may access and manipulate electronic control panel 170. After the repair or maintenance is complete, the technician may pivot second box portion 164 back to the closed configuration and secure it with one or more fasteners. The technician may then reinstall blank plate 190 and indoor grill 146.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A recreational vehicle air conditioner, comprising:
    a ceiling-mount indoor panel defining an air inlet, an air outlet, and a control box recess; and
    a control box comprising a first box portion and a second box portion, the first box portion positioned above the ceiling-mount indoor panel, the second box portion connected to the first box portion with a hinge and being pivotable between a closed configuration and an open configuration on the hinge, wherein the second box portion is seated at least partially within the control box recess in the open configuration, wherein the air inlet defines an inlet depth measured along the transverse direction and the control box recess defines a recess depth measured along the transverse direction, the recess depth being greater than the inlet depth.

2. The recreational vehicle air conditioner of claim 1, wherein the control box is positioned at least partially over the air inlet.

3. The recreational vehicle air conditioner of claim 2, wherein the air inlet defines an inlet flow area and the air outlet defines an outlet flow area, the inlet flow area being substantially similar to the outlet flow area.

4. The recreational vehicle air conditioner of claim 1, wherein the air inlet defines an inlet width measured along the lateral direction and the control box recess defines a recess width measured along the lateral direction, the recess width being greater than half of the inlet width.

5. The recreational vehicle air conditioner of claim 1, further comprising:
    a blank plate removably mounted over the control box recess, the blank plate securing the control box in the closed position and being removable to access the control box.

6. The recreational vehicle air conditioner of claim 1, wherein the control box recess has a rectangular cross-section in a plane that is perpendicular to a vertical direction.

7. The recreational vehicle air conditioner of claim 1, wherein the air inlet and the air outlet each have a rectangular cross-section in a plane that is perpendicular to a vertical direction.

8. The recreational vehicle air conditioner of claim 1, wherein the ceiling-mount indoor panel is constructed from metal.

9. The recreational vehicle air conditioner of claim 1, wherein the second box portion nested within the first box portion in the closed configuration and is pivoted away from the first box portion on the hinge in the open configuration.

10. The recreational vehicle air conditioner of claim 1, further comprising:
    an electronic control panel mounted to the second box portion of the control box.

11. A recreational vehicle, comprising:
    a ceiling defining an opening;
    a ceiling-mount indoor panel defining an air inlet, an air outlet, and a control box recess; and
    a control box assembly mounted to the ceiling-mount indoor panel, the control box assembly comprising:
        a first box portion positioned above the ceiling-mount indoor panel;
        a second box portion pivotally connected to the first box portion and being movable between a closed configuration and an open configuration, wherein the second box portion is seated at least partially within the control box recess in the open configuration, wherein the air inlet defines an inlet width measured along the lateral direction and the control box recess defines a recess width measured along the lateral direction, the recess width being greater than half of the inlet width.

12. The recreational vehicle of claim 11, wherein the control box assembly is positioned at least partially over the air inlet.

13. The recreational vehicle of claim 11, wherein the air inlet defines an inlet depth measured along the transverse direction and the control box recess defines a recess depth measured along the transverse direction, the recess depth being greater than the inlet depth.

14. The recreational vehicle of claim 11, wherein the control box assembly further comprises:
    a blank plate removably mounted over the control box recess, the blank plate securing the second box portion in the closed position.

15. The recreational vehicle of claim 11, wherein the control box recess has a rectangular cross-section in a plane that is perpendicular to a vertical direction.

16. The recreational vehicle of claim 11, wherein the air inlet and the air outlet each have a rectangular cross-section in a plane that is perpendicular to a vertical direction.

17. The recreational vehicle of claim 11, wherein the air inlet defines an inlet flow area and the air outlet defines an outlet flow area, the inlet flow area being substantially similar to the outlet flow area.

18. The recreational vehicle of claim 11, wherein the second box portion nested within the first box portion in the closed configuration and is pivoted away from the first box portion in the open configuration.

19. A recreational vehicle air conditioner, comprising:
    a ceiling-mount indoor panel defining an air inlet, an air outlet, and a control box recess; and a control box comprising a first box portion and a second box portion, the first box portion positioned above the ceiling-mount indoor panel, the second box portion connected to the first box portion with a hinge and being pivotable between a closed configuration and an open configuration on the hinge, wherein the second box portion is seated at least partially within the control box recess in the open configuration, wherein the control box further comprises a blank plate removably mounted over the control box recess, the blank plate securing the second box portion in the closed position.

20. The recreational vehicle of claim 1, wherein the air inlet defines an inlet width measured along the lateral direction and the control box recess defines a recess width measured along the lateral direction, the recess width being greater than half of the inlet width.

\* \* \* \* \*